United States Patent
Lisle et al.

(10) Patent No.: US 10,992,519 B2
(45) Date of Patent: Apr. 27, 2021

(54) STORAGE SYSTEM FOR NETWORK INFORMATION

(71) Applicant: AlienVault, Inc., San Mateo, CA (US)

(72) Inventors: Alex Lisle, Austin, TX (US); Roger Thornton, Austin, TX (US); Russell Spitler, Austin, TX (US); Jaime Blasco, San Francisco, CA (US); Srivathsan Srinivasagoplan, Austin, TX (US)

(73) Assignee: Alien Vault, Inc., San Mateo, CA (US)

( * ) Notice: Subject to any disclaimer, the term of this patent is extended or adjusted under 35 U.S.C. 154(b) by 100 days.

(21) Appl. No.: 15/936,421

(22) Filed: Mar. 26, 2018

(65) Prior Publication Data
US 2019/0296962 A1    Sep. 26, 2019

(51) Int. Cl.
| H04L 12/24 | (2006.01) |
| H04L 12/741 | (2013.01) |
| G06F 11/14 | (2006.01) |
| G06F 9/455 | (2018.01) |

(52) U.S. Cl.
CPC ........ H04L 41/069 (2013.01); G06F 9/45558 (2013.01); G06F 11/1464 (2013.01); H04L 45/745 (2013.01); *G06F 2009/4557* (2013.01); *G06F 2009/45562* (2013.01);
(Continued)

(58) Field of Classification Search
CPC . H04L 41/069; H04L 45/745; G06F 9/45558; G06F 11/1464; G06F 2009/45562; G06F 2009/4557; G06F 2009/45583; G06F 2009/45595; G06F 2201/84
See application file for complete search history.

(56) References Cited

U.S. PATENT DOCUMENTS

| 7,225,343 B1 | 5/2007 | Honig et al. |
| 9,037,825 B1 * | 5/2015 | Donlan ................ G06F 3/0619 707/687 |
| 9,069,930 B1 | 6/2015 | Hart |

(Continued)

OTHER PUBLICATIONS

European Search Report and Opinion dated Sep. 20, 2018 in European Patent Application No. 18173981.4.
(Continued)

*Primary Examiner* — Backhean Tiv
*Assistant Examiner* — Jihad K Boustany
(74) *Attorney, Agent, or Firm* — Hartman & Citrin LLC

(57) ABSTRACT

Techniques are disclosed relating to storage of network event information for multiple tenants. In some embodiments, one or more host computer systems are configured to maintain a plurality of containers operable to isolate network event information of a plurality of tenants from others of the plurality of tenants. The plurality of containers includes a first container that includes a first database executable to store network event information for a first of the plurality of tenants, and a second container that includes a second database executable to store network event information for a second of the plurality of tenants. In some embodiments, a management computer system is configured to receive, from the first tenant, a request to access network event information of the first tenant and route the request to a host computer system maintaining the first container to cause the first database to service the request.

20 Claims, 5 Drawing Sheets

(52) U.S. Cl.
CPC .............. *G06F 2009/45583* (2013.01); *G06F 2009/45595* (2013.01); *G06F 2201/84* (2013.01)

(56) References Cited

U.S. PATENT DOCUMENTS

| | | | |
|---|---|---|---|
| 9,813,449 B1 | 11/2017 | Buenechea et al. | |
| 9,853,941 B2 | 12/2017 | Liang | |
| 2006/0069761 A1* | 3/2006 | Singh | H04L 67/1008 709/222 |
| 2007/0130566 A1* | 6/2007 | van Rietschote | G06F 9/45533 718/1 |
| 2012/0311562 A1 | 12/2012 | Wang et al. | |
| 2013/0058346 A1* | 3/2013 | Sridharan | H04L 12/4666 370/392 |
| 2013/0145006 A1* | 6/2013 | Tammam | G06F 9/5027 709/223 |
| 2013/0291073 A1* | 10/2013 | Dec | G06F 21/41 726/5 |
| 2014/0181804 A1* | 6/2014 | Sakata | G06F 9/455 718/1 |
| 2015/0142856 A1* | 5/2015 | Salinas | G06F 9/45558 707/803 |
| 2015/0207846 A1* | 7/2015 | Famaey | H04L 67/02 709/219 |
| 2016/0277431 A1 | 9/2016 | Yu | |
| 2017/0032130 A1 | 2/2017 | Durairaj et al. | |
| 2018/0069885 A1 | 3/2018 | Patterson | |
| 2018/0083826 A1* | 3/2018 | Wilson | H04L 41/0604 |
| 2018/0139238 A1* | 5/2018 | Schultz | G06F 21/6254 |
| 2018/0205652 A1* | 7/2018 | Saxena | H04L 61/2557 |
| 2018/0232283 A1* | 8/2018 | Bryant | G06F 11/1482 |
| 2018/0287966 A1* | 10/2018 | Kamath | H04L 12/4641 |
| 2018/0343276 A1 | 11/2018 | Lisle et al. | |
| 2019/0075126 A1 | 3/2019 | Muddu | |
| 2019/0158524 A1 | 5/2019 | Zadeh | |
| 2019/0166047 A1* | 5/2019 | Ranjan | H04L 61/2567 |
| 2020/0050607 A1 | 2/2020 | Pal | |

OTHER PUBLICATIONS

U.S. Office Action dated May 14, 2020 in U.S. Appl. No. 15/969,746.

* cited by examiner

STORAGE SYSTEM FOR NETWORK INFORMATION

BACKGROUND

Technical Field

This disclosure relates generally to computer networks, and, more specifically, to maintaining information about events occurring in a computer network.

Description of the Related Art

Modern software as a service (SaaS) providers typically maintain large amounts of information using a multi-tenant architecture approach. In such an architecture, a single database is used to store information from multiple tenants accessing services of the provider. In order to ensure separation of information between tenants, this database may employ a database schema in which each row is marked with a key identifying a particular tenant that owns the information in that row. For example, an SaaS system may provide database services accessible to a first company operating an e-commerce store and a second company operating a customer relationship management (CRM) system. If a user associated with the first company performs an action that generates a query to the database service, this query may be accompanied with a key corresponding to the first company in order to determine what information should be accessed and to prevent the query from obtaining information associated with another tenant such as the second company. As this single database can be quite large, it may be distributed among multiple host computer systems that implement a cluster.

Figure 1:
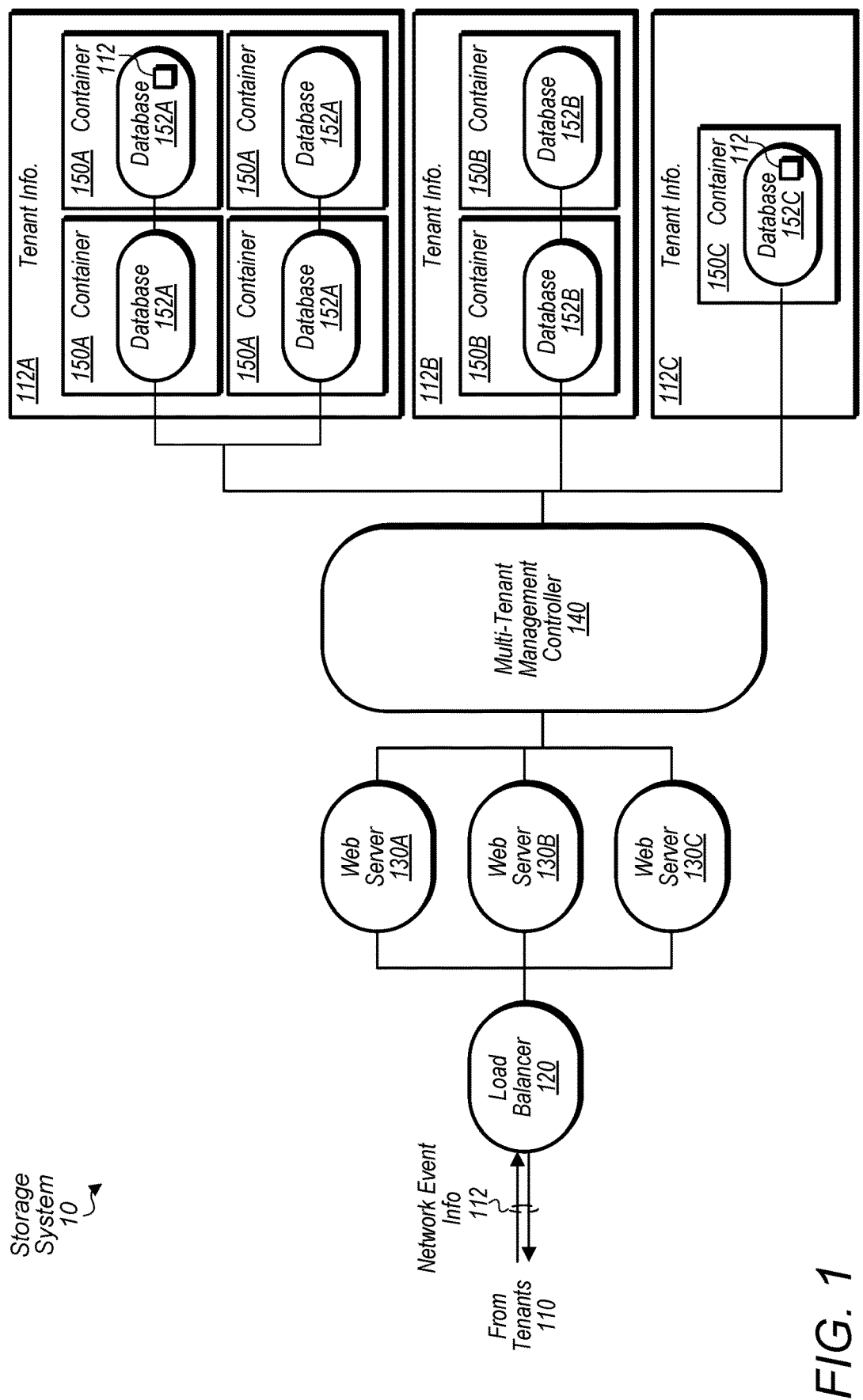
FIG. 1 is a block diagram illustrating one embodiment of a multi-tenant storage system configured to store network event information for multiple tenants.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "host computer system configured to maintain a plurality of containers" is intended to cover, for example, a computer system having program instructions stored therein and one or more storage devices in order to perform this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 122(f) for that claim element. Accordingly, none of the claims in this application as filed are intended to be interpreted as having means-plus-function elements. Should Applicant wish to invoke Section 122(f) during prosecution, it will recite claim elements using the "means for" [performing a function] construct.

As used herein, the terms "first," "second," etc., are used as labels for nouns that they precede, and do not imply any type of ordering (e.g., spatial, temporal, logical, etc.) unless specifically stated. For example, in a graph having multiple nodes, the terms "first" and "second" nodes can be used to refer to any two nodes in the graph. In other words, the "first" and "second" nodes are not limited to the initial two nodes added to the graph.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The traditional multi-tenant architecture provides a cost-effective way to store large amounts of information, but has some significant downsides. As the database grows, it can become increasingly difficult to maintain and groom a large cluster. If one or more host computer systems go down on the cluster, it can cause disruption to all tenants accessing a service. When data is stored in a single database, it can become difficult to keep the database consistent, especially when trying to remove data from the database. If a tenant generates a large amount of data, the cluster can expand extremely fast. Still further, because data of different tenants may be intermingled, it may be difficult to ensure that data leakage (e.g., one tenant receiving another tenant's data) does not occur.

While some of these issues may be tolerable for some applications, these issues may be unacceptable for threat detection applications that store large amounts of confidential network information such as in security information and event management (SIEM) systems or Unified Security Management™ (USM) systems. Accordingly, if the same database is used to store network information belonging to multiple companies, a malicious actor having access to one company's network information may be able to obtain access to another company's network information through exploiting data leakage—and potentially glean knowledge from this information that can be used to exploit that company's network.

The present disclosure describes embodiments of a storage system that attempts to overcome some of these shortcomings. As will be described in greater detail below in various embodiments, rather than comingling network information of different tenants, the storage system assigns each tenant one or more respective containers for storing that tenant's network information. In some embodiments, containers include databases that execute on shared underlying hardware (e.g., the same host computer systems), but each container is operable to isolate its contents from the contents of other containers. Thus, the storage system may be described as multi-tenant as the same host computer systems may maintain containers for multiple tenants, but also be described as providing single-tenant isolation through its use of containers. Accordingly, if a malicious actor potentially compromises the database in one tenant's container, the actor may be unable to perceive what is occurring outside that container—and thus potentially compromise additional containers storing information of other tenants.

In various embodiments, the system also includes a multi-tenant management controller that manages routing traffic between tenants and containers. This controller may, for example, receive traffic identifying a particular tenant and maintain routing information usable to identify the host computer system (and, in some embodiments, specifically the corresponding container) where the traffic should be directed. In some embodiments, the controller monitors various metrics pertaining to the host computer systems and containers. Based on these metrics, the controller can determine to move containers between host computer systems. For example, if a container is performing poorly, the controller may move the container to another host computer system with greater bandwidth. In some embodiments, the controller can also instantiate new containers for a tenant as its information grows. For example, the controller may determine to instantiate a new container if a tenant's existing container exceeds a threshold size.

In many instances, this new approach for storing network event information offers several advantages over the traditional multi-tenant architecture. Most basically, using containers provides a more robust security model that is more resistant to data leakage. The storage system may also have greater resiliency if an individual database (or container) goes down as it does not affect other containers. Still further, as a tenant's information grows, in some embodiments, it can be allocated additional containers and/or containers can be moved to host computer systems having additional storage resources. In some embodiments, grooming can be performed on a per-container basis (as opposed to grooming a large single database). Furthermore, purging a tenant's information can be performed by removing its corresponding containers without affecting content in other containers.

Turning now to FIG. 1, a block diagram of a storage system 10 is depicted. In the illustrated embodiment, system 10 includes a load balancer 120, web servers 130A-130C (referred to herein collectively as "web servers 130" and/or singularity as "web server 130"), a multi-tenant management controller 140, and tenant containers 150A-150C (referred to herein collectively as "containers 150" and/or singularity as "container 50"). In some embodiments, containers 150 may include one or more databases 152A-152C (referred to herein collectively as "databases 152" and/or singularity as "databsase 152"), and one or more containers 150 may be associated with a given tenant 110. In some embodiments, system 10 may include more (or less) elements than shown. For example, system 10 may include multiple controllers 140 that communicate together to implement functionality described herein, servers other than web servers 130 may interact with controller 140, load balance 120 may not be present, etc.

In order to detect potential network security issues, in various embodiments, tenants 110 provide information about the events occurring within their networks (shown as network event information 112) for storage and/or analysis. These events may, for example, be observable behaviors of a device, software, or an end-user in a network computing environment and may include, for example, network devices being coupled to or removed from a network, network devices establishing connections with one another or devices external to the network, users logging into network devices, software packages being installed on network devices, the use of particular network protocols for communicating information, etc. In some embodiments, information 112 is collected by sensors interspersed throughout a network to monitor the events occurring in the network. Accordingly, network event information 112 may include any of various suitable types of information such as events witnessed by sensors and forwarded to system 10, log files including text describing various aspects of a device, etc. Network event information 112 may also be collected from other suitable sources of threat detection information such as computers coupled to the network (e.g., personal computers, mobile devices, servers, etc.), network hardware (e.g., routers, firewalls, switches, virtual private network (VPN) appliances, etc.), resources (e.g., printers, scanners, appliances, etc.), or other suitable hardware. Network event information 112 may also be generated by the underlying hardware, the kernel in a device, or various software within a given device. As such, sensors may be implemented in software and/or hardware to collect network event information 112 and provide it to components of system 10. Network event information 112 may also employ various formats such as JavaScript Object Notation (JSON), Extensible Markup Language (XML), etc. In various embodiments, tenants 110 correspond to various entities such as individuals, companies, non-profits, or other organizations.

As requests to store and access information 112 are received from tenants 110, this network traffic may be provided, in the illustrated embodiment, to load balancer 120. In various embodiments, load balancer 120 is a computer system/network device configured to monitor workloads of web servers 130 and route traffic to servers 130 in a manner that balances workloads across servers 130.

In some embodiments, load balancer 120 is also configured to tag network traffic destined for containers 150 with an indication of the associated tenant 110 in order to facilitate routing information 112 to the appropriate containers 150 as will be discussed below. (In other embodiments, an indication of the associated tenant 110 may be included by another entity such as tenants 110, servers 130, or controller 140.) Accordingly, if a particular tenant 110 is submitting a request to store or access information 112, balancer 120 may include, with the request, a value identifying the particular tenant 110 to controller 140 in order to facilitate routing the request. In some embodiments, this value is a universally unique identifier (UUID) that is unique to the particular tenant 110 and included in the request. In another embodiment, this value is a uniform resource locator (URL) that is unique to the particular tenant 110 and included in (e.g., appended to) the request. In other embodiments, other techniques may be used identify traffic as belonging to a particular tenant 110. In some embodiments, load balancer 120 may identify incoming traffic as belonging to a particular tenant 110 based on information included in the traffic. For example, in some embodiments, load balancer 120 executes a domain name system (DNS) server that translates a domain associated with a particular tenant 110 to a unique identifier of the tenant 110 (e.g., the tenant's UUID). Accordingly, upon identifying the domain name associated with a particular tenant 110, balancer 120 may include the unique tenant identifier in traffic before providing the traffic to web servers 130.

Web servers 130, in various embodiments, are computer systems configured to facilitate interaction between tenants 110 and databases 152. In some embodiments, web servers 130 provide an interface for receiving network event information 112 from tenant 110; however, in other embodiments, network event information 112 may be received differently. In various embodiments, web servers 130 provide an interface for requesting access to information 112 in databases 152. For example, in one embodiment, servers 130 may present a web portal that allows a tenant 110 to submit a query to its database 152 and view various statics about its network. The web portal may also present various alerts pertaining to potential security threats identified from information 112. In some embodiments, web servers 130 may also perform various processing of information 112. For example, in some embodiments, servers 130 may implement the functionality described with respect to normalizer 120, state mapper 140, correlation engine 160, and/or user interface 170 described in U.S. Prov. Appl. No. 62/511,479 filed on May 26, 2017, which is incorporated by reference herein in its entirety. In other embodiments, this functionality may be implemented by other computer systems interacting with system 10.

Multi-tenant management controller 140, in various embodiments, is a computer system configured to route network traffic between servers 130 and containers 150. As will be discussed below in FIG. 2, controller 140 may maintain various information usable to identify a particular container 150 as being associated with received traffic (e.g., based on tagging by servers 130) and direct the traffic to that container 150. For example, controller 140 may maintain a routing table that maps UUIDs to internet protocol (IP) addresses of containers 150 (or the host computers including the containers 150). Accordingly, controller 140 may examine the UUID in an incoming packet and replace the destination address in the packet with the IP address corresponding to the UUID as indicated by the routing table. In some embodiments, routing traffic to only its appropriate container 150 may provide additional security; however, in some embodiments, databases 152 may perform further authentication of tenants 110 prior to servicing requests to store or access information 112.

In various embodiments, multi-tenant management controller 140 is also configured to perform various management operations associated with containers 150. As will be described below with respect to FIG. 2, controller 140 may monitor various health metrics pertaining to containers 150 (or the host computer systems that store containers 150). Controller 140 may then take various actions based on these metrics. For example, in some embodiments, controller 140 may balance distribution of containers 150 across the host computer systems, so that containers 150 have adequate processor and storage resources. Accordingly, if a particular container 150 does not have sufficient resources, controller 140 may cause that container 150 to be moved to another host computer system. In some embodiments, controller 140 can also instantiate new containers 150 for a tenant 110 as its information 112 grows. For example, controller 140 may determine that container 150C has exceeded a particular size threshold and automatically instantiate a second container 150C for maintaining tenant information 112C. In some embodiments, controller 140 may also automatically create atomic snapshots/backups of containers 150 periodically, and may restore a container 150 from a snapshot in response to that container 150 experiencing a problem. In some embodiments, controller 140 may also facilitate grooming of containers 150, including the removal of containers 150. For example, if a particular tenant 110 no longer wants to store information 112 in system, controller 140 may instruct to the host computer systems to remove the containers 150 having information 112 of that tenant 110.

Tenant containers 150, in various embodiments, are operable to isolate network event information 112 for a single tenant 110 from access by other tenants 110. Accordingly, a tenant 110 having access to its container 150A would be unable to access content of another tenant 110 within a container 150B for example. In some embodiments, containers 150 achieve isolation by limiting what can be perceived by processes, such as a database 152, executing within a container 150. For example, a process within a container 150 may be prevented from knowing about other processes outside of the container 150 such as processes in other containers 150, operating system processes, etc. In some embodiments, containers 150 also present a limited perspective of the underlying network stack used to communicate with entities external to the containers 150. For example, as will be described with FIG. 3, a container 150 may be responsible for maintaining its own network stack information and is unware of network stack information maintained by other containers or by the host computer system's operating system. The container 150 may also be presented with a virtual interface through which traffic is to be directed (as opposed to having direct access to the physical interface controlling a network interface card). Restricting visibility in this manner may reduce the attack surface available to a malicious actor that compromises a process in a given container 150 such as a database 152 accessible to the actor. Containers 150 may be implemented using any suitable form of container such as a virtual machine, hypervisor image, Linux container (LXC), control group (Cgroup), namespaces, Docker™ container, etc. In the illustrated embodiment, a given container 150 includes single database 152. For example, as shown, a tenant 110 associated with tenant information 112A may have four containers 150A, each with a respective database 152A storing a portion of information 112A. In instances when a tenant 110 has multiple databases 152, databases 152 may interact with one another, however, to implement a database cluster that appears as a single logical unit to the tenant 110. In such an embodiment, databases 152 within different containers 150 may exchange messages to facilitate storing information 112 and servicing queries. Although databases 152 are depicted as being within containers 150, in some embodiments, a database 152 associated with a particular container 150 may be external to that container 150 and accessible via a process executing within that container 150.

Databases 152, in various embodiments, are executable to maintain network information 112 for tenants 110. Accordingly, as noted above, databases 152 may receive requests from tenants 110 to store information 112 as well as requests to access that information 112. In some embodiments, information 112 in databases 152 may also be analyzed by one or more processes applying various detection heuristics by running multiple stored threat detection routines that assess various aspects about a network in order to identify potential threats and to generate corresponding notifications to an administrator, which may be presented via servers 130. Databases 152 may be implemented using any suitable organization scheme and may be organized in a manner that allows useful insights to be gleaned about the interrelationship of the network event information. Accordingly, in some embodiments, a database 152 is a data store that maintains information collected over time about a network and is implemented as a relational database management system (RDBMS). For example, in one embodiment, databases 152 include databases corresponding to event store 130 in the '479 application referenced above. In some embodiments, a database 152 organizes information 112 in a graph structure that models past and current states of a network. In such an embodiment, the database 152 may be implemented using a Triple store, a Resource Description Framework (RDF) store, graph database, etc. For example, in one embodiment, databases 152 include databases corresponding to graph database 150 in the '479 application referenced above. A host computer system configured to execute databases 152 included in containers 150 is discussed below with respect to FIG. 3.

Figure 2:
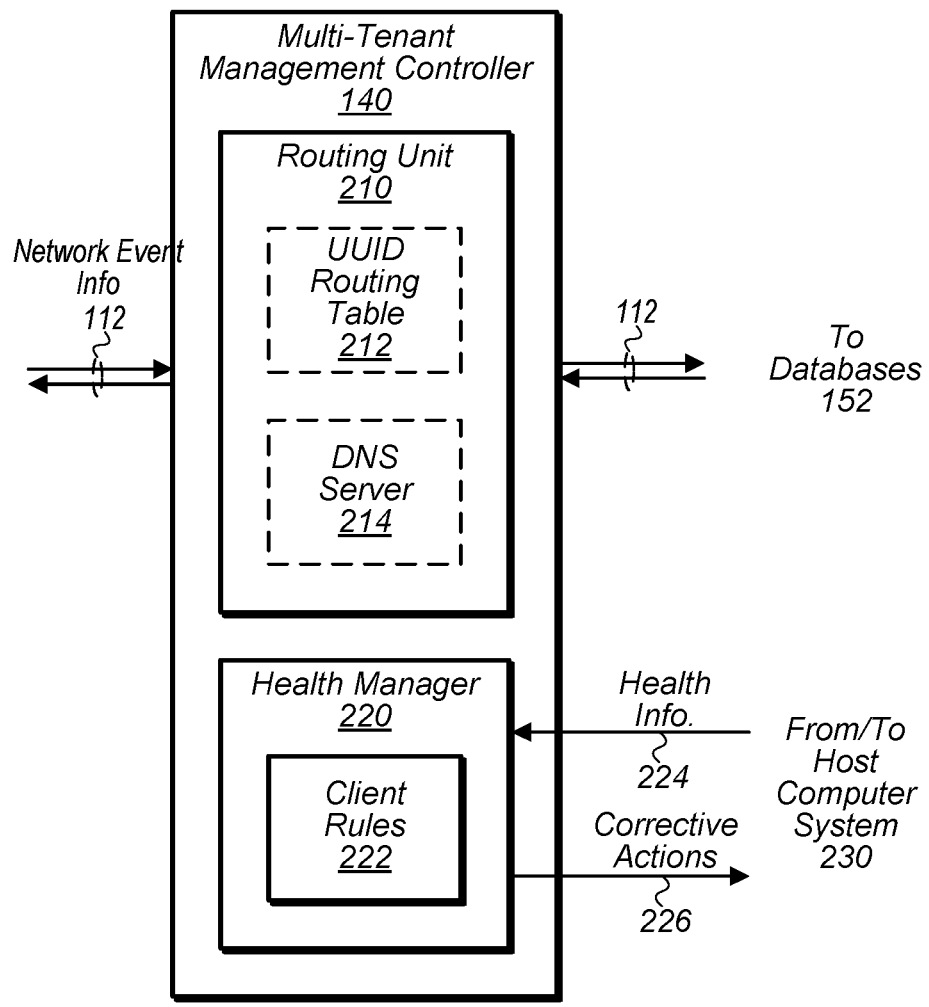
FIG. 2 is a block diagram illustrating one embodiment of a multi-tenant management controller of the storage system.

Turning now FIG. 2, a block diagram of multi-tenant management controller 140 is depicted. As noted above, in some embodiments, controller 140 routes network traffic to containers 150 and performs various management operations with respect to containers 150. In the illustrated embodiment, controller 140 implements this functionality using a routing unit 210 and a health manager 220. In other embodiments, controller 140 may be implemented differently than shown. For example, although depicted as a single block, controller 140 may be implemented by multiple computer systems and/or execute multiple processes to implement functionality described herein.

Routing unit 210, in various embodiments, is operable to facilitate routing network packets including network event information 112 from web servers 130 to corresponding containers 150. In some embodiments, as shown, routing unit 210 includes a UUID routing table 212 that maps UUIDs to corresponding IP addresses of containers 150 (or the underlying host computers including the containers 150). For example, routing table 212 may map the UUID for a tenant 110 associated with containers 150A to an IP addressed to a particular container 150A, which analyzes a given received packet and has its database 152A process that packet or distribute the packet to another container 150A for processing. In other embodiments, as shown, routing unit 210 includes DNS server 214 executable to translate domain names into corresponding IP addresses of containers 150. For example, as noted above, a tenant 110 may be assigned a unique domain name, which is translated to an IP address corresponding to a container 150 associated with that tenant 110. In another embodiment, routing unit 210 includes URL routing table that associates particular URLs with IP addresses of particular containers 150. Accordingly, routing unit 210 may examine a particular URL (which may include a tenant 110's unique domain name) included in received network event information 112 and reference the table to determine an IP address to direct information 112. In still other embodiments, other techniques may be used to identify containers 150 associated with received network traffic and appropriately route the traffic.

Health manager 220, in various embodiments, analyzes various health information 224 received from host computer systems 230 that maintain containers 150. This information 224 may include various performance information about systems 230 (or containers 150) such as processing ability, system utilization, downtime, number of executing processes, etc. This information 224 may also include various storage information such as available storage space, current volatile memory usage, the size of containers 150, the number of containers 150, etc. This information 224 may also include heartbeat information indicating whether host computer systems 230 (or containers 150) are active and functioning correctly. Based on this analysis, health manager 220 may perform various corrective actions 226 as dictated by client rules 222.

In some embodiments, corrective actions 226 include moving containers 150 between host computer systems 230. As noted above, manager 220 may balance distribution of containers 150 across host computer systems 230. Accordingly, this may include moving containers 150 to underutilized host computer systems 230 if those containers 150 are unable to obtain various quality of service metrics as defined by rules 222. In some embodiments, corrective actions 226 include hot and cold swapping containers 150. That is, containers 150 may have different utilizations based on how frequently tenants 110 store and access information 112. As such, manager 220 may move containers 150 with greater utilizations (e.g., hot containers 150) to host computer systems 230 that can provide greater performance and less utilized containers 150 to host computer systems 230 that provide less performance. In some embodiments, manager 220 may also suspend and resume containers 150 based on current demand. If utilizations change, manager 220 may redistribute containers 150 accordingly. Still further, if a particular tenant 110 pays more to store information 112, its containers 150 may be treated as having greater utilization than those that pay less. In some embodiments, hot and cold swapping may include grouping containers 150 in pools of varying performance and switching containers 150 to pools with higher performances when accessed by tenant 110 to give a better user experience. In some embodiments, containers 150 with newer information 112 (e.g., information 112 received in the last twenty-four hours) may be moved to host computer systems 230 capable of providing better performance than the performance of host computers systems 230 with containers 150 including older information 112.

In some embodiments, corrective actions 226 include instantiating new containers 150. As noted above, manager 220 may monitor the sizes/memory consumptions of containers 150 as additional information 112 is stored. If manager 220 determines that a particular container 150 of tenant 110 satisfies a particular size threshold as defined by a client rule 222, manager 220 may cause a new container 150 to be instantiated for that tenant 110. In some embodiments, the new container 150 may be instantiated from a default, previously established image. In other embodiments, manager 220 may create a new container 150 and perform various operations to provision it such as installing a database 152, initializing network stack information, etc.

In some embodiments, corrective actions 226 include restoring containers 150 from snapshots. As noted above, controller 140 may periodically and automatically generate snapshots from containers 150. Accordingly, if health information 224 indicates that a container 150 is experiencing a problem, manager 220 may determine, based on a client rule 222, to instruct a host computer system 230 to automatically restore the container 150 from a snapshot. In another embodiment, writes from container 150 may be recorded using a copy-on-write (COW) recording scheme. In such an embodiment, manager 220 may read previous writes to restore a container 150 to a previous state corresponding to particular point in time.

In some embodiments, manager 220 may also perform various other actions noted above such as, removing containers 150, grooming containers 150, re-indexing databases 152, performing data migrations, updating containers 150 or databases 152, etc.

Figure 3:
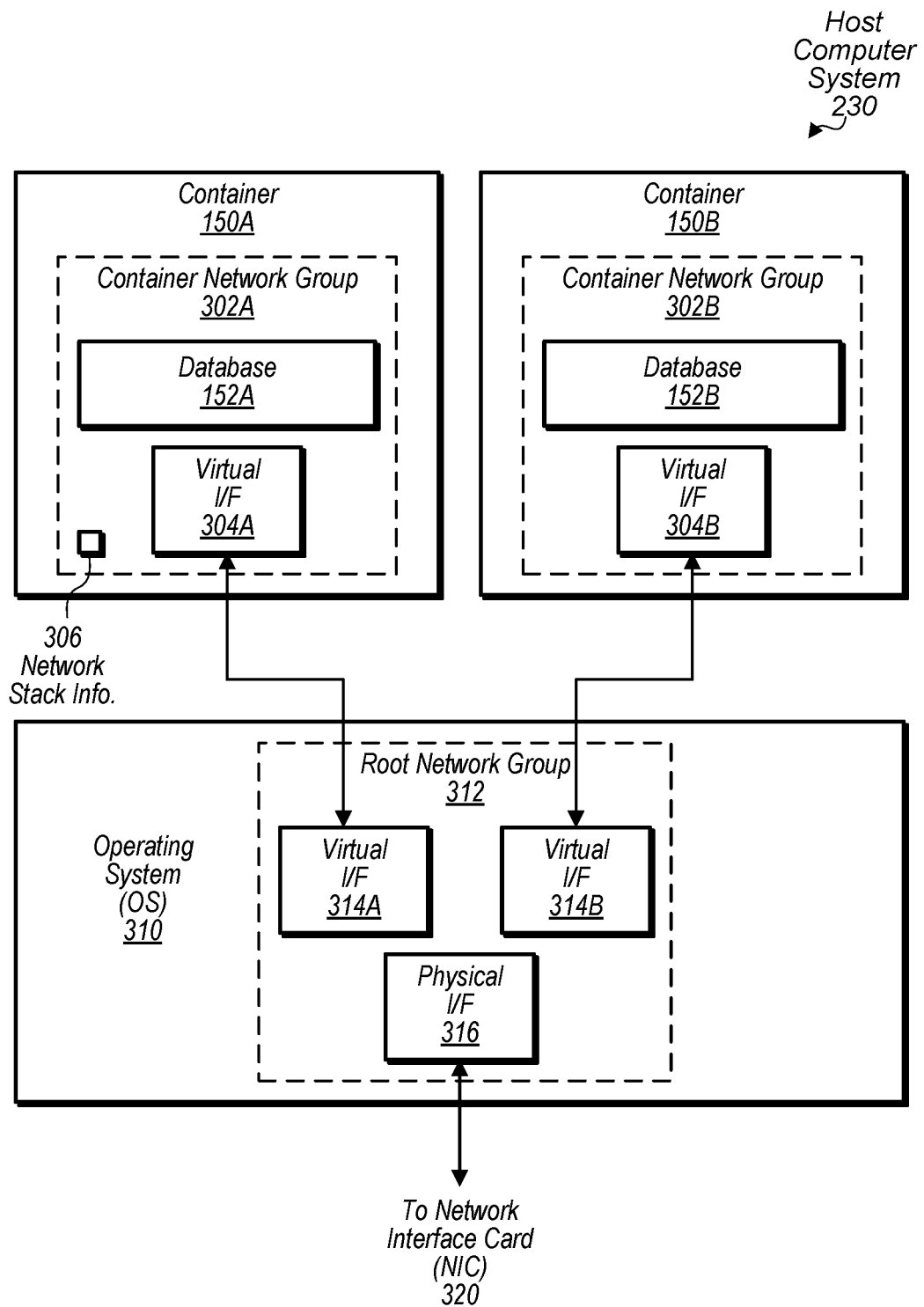
FIG. 3 is a block diagram illustrating one embodiment of a host computer system configured to maintain multiple containers that store the network event information.

Turning now to FIG. 3, a block diagram of a host computer system 230 is depicted. In the illustrated embodiment, host computer system 230 includes containers 150A and 150B, an operating system (OS) 310, and a network interface card (NIC) 320. In other embodiments, host computer system 230 may be implemented differently than shown. For example, as will be discussed below, system 230 may use network groups to limit visibility of a network; in other embodiments, visibility may be limited using techniques other than network groups.

OS 310, in various embodiments, is executable to manage various aspects of computer system 230, including distributing network traffic received via NIC 320 for containers 150. Accordingly, this distributing may include examining IP addresses for incoming packets and providing them to the appropriate containers 150 assigned to those addresses. In some embodiments, this may also perform network address translations (NAT) for traffic. Similarly, OS 310 may facilitate routing traffic from containers 150 to tenants 110.

In the illustrated embodiment, OS 310, however, does not permit processes in containers 150, such as databases 152, to interact directly with the physical interface 316 controlling NIC 320. Rather, OS 310 restricts access of physical interface 316 to processes assigned to root network group 312, which may include only operating system processes. As used herein, the term "network group" has its ordinary and established meaning in the art, which includes a set of restrictions for using a network interface that are applied to a group of processes. Accordingly, processes assigned to root network group 312 may have minimal restrictions and be permitted to interact with physical interface 316. These processes may also be able to access and modify network stack information maintained by OS 310, which may include, for example, routing table information, IP addresses and subnets for interfaces, transport control protocol (TCP) and user datagram protocol (UDP) port mappings, etc.

In contrast to processes assigned to root network group 312, processes in a container 150, such as database 152, may be assigned to a respective container network group 302A-302B (referred to herein collectively as "container network groups 302" and/or singularly as "container network group 302"), which is more restrictive than root network group 312. Accordingly, processes assigned to a container network group 302 may be unable access interface 316 and the network stack information maintained by OS 310—in fact, these processes may be unaware of the existence of these elements. To facilitate communication, in some embodiments, a virtual interface 304A-304B (referred to herein collectively as "virtual interfaces 304" and/or singularly as "virtual interface 304") may be created in a container 150 for processes assigned to a container network group 302. This interface 304 may then be linked to a corresponding virtual interface 314A-314B (referred to herein collectively as "virtual interfaces 314" and/or singularly as "virtual interface 314") associated with root network group 312. If a process, such as database 352, wants to send traffic via NIC 320, the process conveys traffic via virtual interface 304 to virtual interface 314, where an OS process assigned to root network group 312 conveys the traffic to physical interface 316.

Having a separate network group 302, a container 150, in some embodiments, is responsible for maintaining its own network stack information 306 associated with virtual interface 304. This information 306 may a list of any virtual interfaces 304 available to container 150 and include the IP addresses assigned to those interfaces 304. Accordingly, traffic directed to the container 150 may specify the IP address assigned to an interface 304 in some embodiments. This information 306 may also include a routing table identifying the routes available to an interface 304 for sending traffic. Accordingly, if a database 152 is generating a response to a request to access information 112, interface 304 may examine this routing table to identify a route to send a response to the tenant 110. As each container 150 may be associated with a respective network group 302, in some embodiments, processes in one container (e.g., container 150A) are unaware of virtual interfaces 304 and network stack information 306 established for another container (e.g., container 150B). In some embodiments, containers 150 associated with the same tenant 110 (e.g., all containers 150A) may be assigned to the same network group 302 (e.g., group 302A); however, containers 150 associated with different tenants (e.g., containers 150A and containers 150B) may be assigned to different groups 302 (e.g., groups 302A and 302B).

Although virtual interfaces 304 may be used to communicate traffic via traffic NIC 320, in some embodiments, virtual interfaces 304 may also be used to communicate messages with other containers 150, such as those belonging to the same network group 302. For example, if multiple databases 152 are working together to store information 112 for a particular tenant 110, databases 152 may communicate messages with one another via interfaces 304. In such an embodiment, a container 150 may provide a message via an interface 304 to an OS process associated with root network group 312, which may route the message via an interface 314 to another container 150. In some embodiments, one or more additional routes for containers 150 may be added to the routing table in network stack information 306 in order to ensure that the messages are conveyed correctly.

Figure 4A:
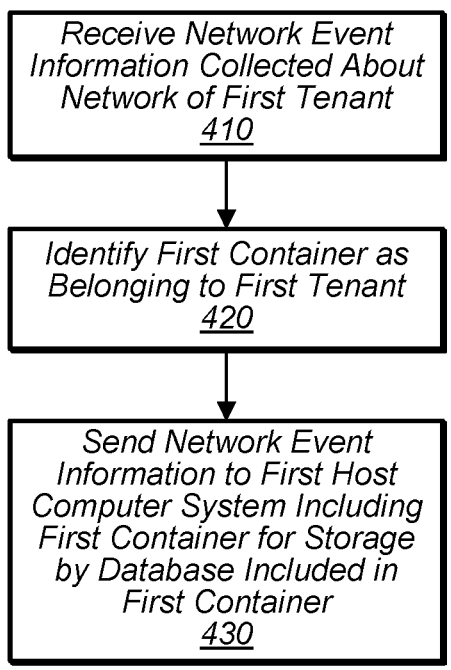
FIGS. 4A-B are flow diagrams illustrating embodiments of methods associated with data storage.

Turning now to FIG. 4A, a flow diagram of a method 400 is depicted. Method 400 is one embodiment of a method that may be performed by a computer system attempting to provide access to multiple containers such as management controller 140 (or more generally storage system 10). In many instances, performance of method 400 (as well as method 450) allows for greater protection of network event information collected from multiple tenants.

Method 400 begins in step 410 with network event information (e.g., information 112) collected about a network of a first of a plurality of tenants (e.g., tenants 110) being received. In some embodiments, the network event information indicates events that occurred within the network as identified by a plurality of network devices coupled to the network; the network event information is also usable to identify threats associated with the network. In step 420, a first of a plurality of containers is identified as belonging to the first tenant. In such an embodiment, the plurality of containers is hosted on a plurality of host computer systems (e.g., host computer systems 230), and each of the plurality of containers includes a database (e.g., database 152) executable to store network event information for a respective one of a plurality of tenants. In step 430, the network event information is sent to a first host computer system including the first container for storage by the database included in the first container. In some embodiments, method 400 includes monitoring performances (e.g., as indicated by health information 224) of the plurality of host computer systems and, based on the monitoring, balancing distribution of the plurality of containers among the plurality of host computer systems, including causing the first container to be moved from the first host computer system to a second of the plurality of computer systems. In some embodiments, method 400 includes monitoring a storage consumption of the first container and, based on the monitoring, causing a second container to be instantiated at the first host computer system, the second container including a second database executable to store network event information from the first tenant. In some embodiments, method 400 includes receiving a request to remove network event information of the first tenant and instructing the first host computer system to remove the first container.

Figure 4B:
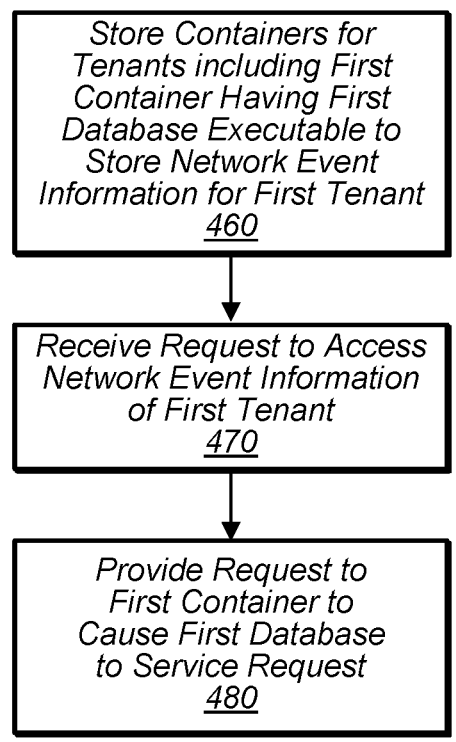

Turning now to FIG. 4B, a flow diagram of a method 450 is depicted. Method 450 is one embodiment of a method that may be performed by a host computer system such as host computer system 230.

Method 450 begins in step 460 with a plurality of containers (e.g., containers 150) for a plurality of tenants (e.g., tenants 110) being stored. In various embodiments, the plurality of containers includes a first container (e.g., container 150A) that includes a first database (e.g., database 152A) executable to store network event information for a first of the plurality of tenants, and includes a second container (e.g., container 150B) that includes a second database (e.g., database 152B) executable to store network event information for a second of the plurality of tenants. In some embodiments, the network event information for the first tenant identifies events that occurred in a network operated by the first tenant. In some embodiments, the first container is a hypervisor image. In step 470, a request is received to access network event information of a first tenant. In step 480, the request is provided to the first container to cause the first database to service the request. In some embodiments, the first container maintains a routing table (e.g., in network stack information 306) identifying a route usable to communicate with the first tenant, and the first database sends a response to the request via the route. In some embodiments, the first container sends a message from the first database to an operating system (e.g., operating system 310) of the host computer system, the message being directed to a third database in a third container of the first tenant. In such an embodiment, the operating system routes the message to the third database. In some embodiments, the first database authenticating the first tenant prior to servicing the request.

Exemplary Computer System

Figure 5:
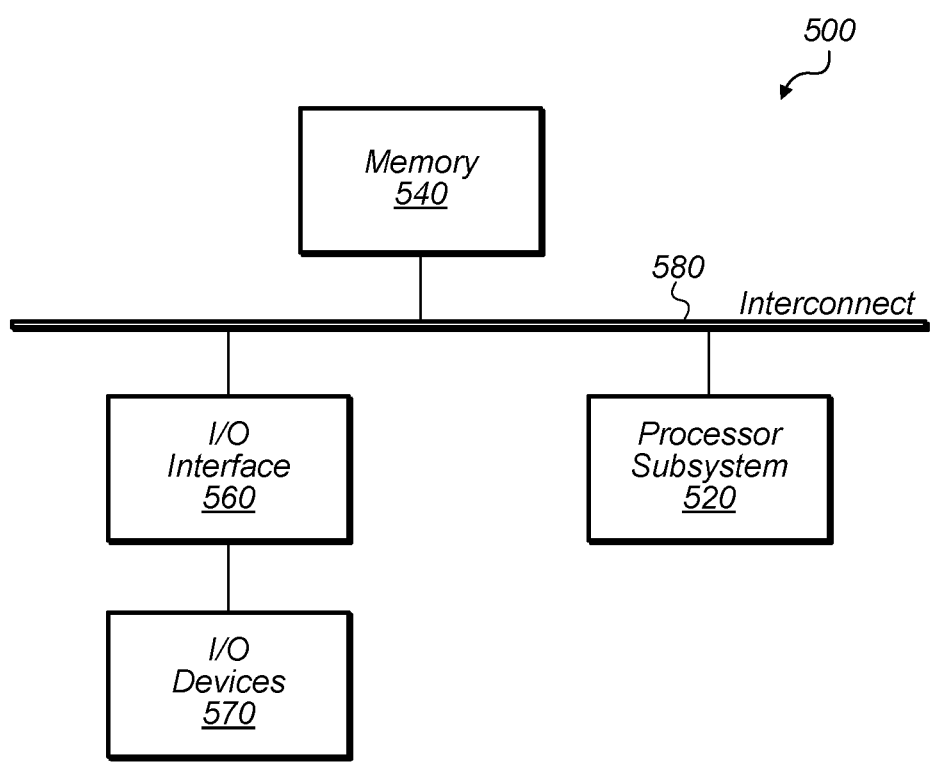
FIG. 5 is a block diagram illustrating one embodiment of an exemplary computer system, which may implement the functionality described herein.

Turning now to FIG. 5, a block diagram of an exemplary computer system 500, which may implement one or more of elements 110-150 and 300, is depicted. Computer system 500 includes a processor subsystem 520 that is coupled to a system memory 540 and I/O interfaces(s) 560 via an interconnect 580 (e.g., a system bus). I/O interface(s) 560 is coupled to one or more I/O devices 570. Computer system 500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 500 is shown in FIG. 5 for convenience, system 500 may also be implemented as two or more computer systems operating together to implement a computer cluster or cloud system. In various embodiments, system 500 may provide functionality described herein via a Software as a Service (SaaS) or Platform as a Service (PaaS) distribution model.

Processor subsystem 520 may include one or more processors or processing units. In various embodiments of computer system 500, multiple instances of processor subsystem 520 may be coupled to interconnect 580. In various embodiments, processor subsystem 520 (or each processor unit within 520) may contain a cache or other form of on-board memory.

System memory 540 is usable to store program instructions executable by processor subsystem 520 to cause system 500 to perform various operations described herein. System memory 540 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 500 is not limited to primary storage such as memory 540. Rather, computer system 500 may also include other forms of storage such as cache memory in processor subsystem 520 and secondary storage on I/O Devices 570 (e.g., a hard drive, storage array, etc.). In some embodiments, these other forms of storage may also store program instructions executable by processor subsystem 520.

I/O interfaces 560 may be any of various types of interfaces configured to couple to and communicate with other devices, according to various embodiments. In one embodiment, I/O interface 560 is a bridge chip (e.g., Southbridge) from a front-side to one or more back-side buses. I/O interfaces 560 may be coupled to one or more I/O devices 570 via one or more corresponding buses or other interfaces. Examples of I/O devices 570 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via I/O device 570 (e.g., configured to communicate over WiFi, Bluetooth, Ethernet, etc.), which may correspond to network interface card 320.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system comprising:
a host computer system configured to maintain a plurality of containers operable to isolate network event information of a plurality of tenants from others of the plurality of tenants, wherein the plurality of containers includes a first container that includes a first database executable to store network event information for a first tenant of the plurality of tenants, wherein the plurality of containers includes a second container that includes a second database executable to store network event information for a second tenant of the plurality of tenants, and wherein the host computer system comprises a physical interface and an operating system that, when executed, causes the host computer system to perform operations comprising
assigning processes of the operating system to a root network group, wherein assignment to the root network group permits the processes of the operating system to access the physical interface of the host computer system and to access network stack information maintained by the operating system,
assigning the first database of the first container to a first container network group associated with a set of restrictions, wherein assignment of the first database of the first container to the first container network group isolates the network event information for the second tenant of the second database of the second container from the first container by restricting, based on the set of restrictions associated with the first container network group, the first database from accessing the physical interface of the host computer system, the network stack information maintained by the operating system, and network stack information maintained by the second container, and
assigning the second database of the second container to a second container network group associated with a set of restrictions, wherein assignment of the second database of the second container to the second container network group isolates the network event information for the first tenant of the first database of the first container from the second container by restricting, based on the set of restrictions associated with the second container network group, the second database from accessing the physical interface of the host computer system, the network stack information maintained by the operating system, and network stack information maintained by the first container; and
a management computer system comprising a processor that performs operations comprising
receiving, from the first tenant, a request to access at least a portion of the network event information for the first tenant, wherein the request includes a value that uniquely identifies the first tenant,
determining, based on the value that uniquely identifies the first tenant, that the first container is associated with the first tenant, and
routing the request to the host computer system maintaining the first container.

2. The system of claim 1, wherein the network event information for the first tenant includes information collected from a plurality of network devices coupled to a network operated by the first tenant, and wherein the network event information for the first tenant is usable to identify threats associated with the network.

3. The system of claim 1, wherein the operations further comprise maintaining a table that maps values that uniquely identify the plurality of tenants to internet protocol (IP) addresses assigned to the plurality of containers, wherein routing the request includes using the table to translate the value that uniquely identifies the first tenant to an IP address assigned to the first container and sending the request to the IP address assigned to the first container.

4. The system of claim 1, further comprising a computer system configured to:
identify a domain name associated with the request;
translate the domain name associated with the request to the value that uniquely identifies the first tenant; and
include the value that uniquely identifies the first tenant in the request.

5. The system of claim 1, wherein the first container is operable to:
maintain, in the first container, the network stack information for the first container, wherein the network stack information for the first container includes a routing table identifying a route usable to communicate with the first tenant; and
convey, via the route, a response from the first database to the request.

6. The system of claim 5, wherein the network stack information for the first container identifies a first virtual interface of the first container, and wherein the response is conveyed via the first virtual interface.

7. The system of claim 1, wherein the operations further comprise:
evaluating a performance of the first container at the host computer system; and
based on the performance, moving the first container from the host computer system to a different host computer system.

8. The system of claim 1, wherein the operations further comprise:
evaluating memory consumption of the first container at the host computer system; and
instantiating a third container that includes a third database executable to store the network event information for the first tenant, wherein the network event information for the first tenant is distributed between the first and third databases, and wherein the first and third databases implement a database cluster.

9. The system of claim 1, wherein the operations further comprise:
creating a snapshot of the first container including the first database; and
in response to detecting a failure associated with the first container, restoring the first container from the snapshot.

10. The system of claim 1, wherein the first and second containers are virtual machines.

11. A method comprising:
storing, by a host computer system comprising a physical interface and an operating system, a plurality of containers for a plurality of tenants, wherein the plurality of containers includes a first container that includes a first database executable to store network event information for a first tenant of the plurality of tenants, and wherein the plurality of containers includes a second container that includes a second database executable to store network event information for a second tenant of the plurality of tenants;

assigning, by the host computer system, processes of the operating system to a root network group, wherein assignment to the root network group permits the processes of the operating system to access the physical interface of the host computer system and to access network stack information maintained by the operating system;

assigning, by the host computer system, the first database of the first container to a first container network group associated with a set of restrictions, wherein assignment of the first database of the first container to the first container network group isolates the network event information for the second tenant of the second database of the second container from the first container by restricting, based on the set of restrictions associated with the first container network group, the first database from accessing the physical interface of the host computer system, the network stack information maintained by the operating system, and network stack information maintained by the second container;

assigning, by the host computer system, the second database of the second container to a second container network group associated with a set of restrictions, wherein assignment of the second database of the second container to the second container network group isolates the network event information of the first tenant of the first database of the first container from the second container by restricting, based on the set of restrictions associated with the second container network group, the second database from accessing the physical interface of the host computer system, the network stack information maintained by the operating system, and network stack information maintained by the first container;

receiving, by the host computer system, a request to access at least a portion of the network event information for the first tenant; and providing, by the host computer system, the request to the first container.

12. The method of claim 11, wherein the network event information for the first tenant identifies events that occurred in a network operated by the first tenant, wherein the first container is a hypervisor image.

13. The method of claim 11, further comprising:
maintaining, at the first container, a routing table identifying a route usable to communicate with the first tenant; and
sending, by the first database, a response to the request via the route.

14. The method of claim 11, further comprising:
sending, by the first container, a message from the first database to the operating system of the host computer system, wherein the message is directed to a third database in a third container of the first tenant; and
routing, by the operating system, the message to the third database.

15. The method of claim 11, wherein the first database of the first container authenticates the first tenant prior to servicing the request.

16. A non-transitory computer readable medium storing instructions that, when executed by a processor of a host computer system comprising a physical interface and an operating system, causes the processor to perform operations comprising:

storing a plurality of containers for a plurality of tenants, wherein the plurality of containers includes a first container that includes a first database executable to store network event information for a first tenant of the plurality of tenants, and wherein the plurality of containers includes a second container that includes a second database executable to store network event information for a second tenant of the plurality of tenants;

assigning processes of the operating system to a root network group, wherein assignment to the root network group permits the processes of the operating system to access the physical interface of the host computer system and to access network stack information maintained by the operating system;

assigning the first database of the first container to a first container network group associated with a set of restrictions, wherein assignment of the first database of the first container to the first container network group isolates the network event information for the second tenant of the second database of the second container from the first container by restricting, based on the set of restrictions associated with the first container network group, the first database from accessing the physical interface of the host computer system, the network stack information maintained by the operating system, and network stack information maintained by the second container;

assigning the second database of the second container to a second container network group associated with a set of restrictions, wherein assignment of the second database of the second container to the second container network group isolates the network event information for the first tenant of the first database of the first container from the second container by restricting, based on the set of restrictions associated with the second container network group, the second database from accessing the physical interface of the host computer system, the network stack information maintained by the operating system, and network stack information maintained by the first container;

receiving a request to access at least a portion of the network event information for the first tenant; and providing the request to the first container.

17. The non-transitory computer readable medium of claim 16, wherein the network event information for the first tenant identifies events that occurred in a network operated by the first tenant, wherein the first container is a hypervisor image.

18. The non-transitory computer readable medium of claim 16, wherein the first container maintains a routing table identifying a route usable to communicate with the first tenant, and wherein the first database sends a response to the request via the route.

19. The non-transitory computer readable medium of claim 16, wherein the first container sends a message from the first database to the operating system of the host computer system, and wherein the message is directed to a third database in a third container of the first tenant.

20. The non-transitory computer readable medium of claim 16, wherein the first database of the first container authenticates the first tenant prior to servicing the request.

* * * * *